United States Patent [19]

Williams et al.

[11] 4,018,201

[45] Apr. 19, 1977

[54] FUEL SUPPLY SYSTEMS FOR DIESEL ENGINES

[75] Inventors: Malcolm Williams, Solihull; Christopher Robin Jones, Alcester, both of England

[73] Assignee: C.A.V. Limited, Birmingham, England

[22] Filed: May 15, 1975

[21] Appl. No.: 577,644

[30] Foreign Application Priority Data

May 17, 1974  United Kingdom ............ 22105/74

[52] U.S. Cl. .............................. 123/139 E; 307/31
[51] Int. Cl.² ............................................ H02J 1/00
[58] Field of Search .......... 123/32 EA, 102, 139 E; 317/31

[56] References Cited

UNITED STATES PATENTS

| | | | |
|---|---|---|---|
| 3,350,627 | 11/1967 | Wright | 317/31 |
| 3,430,615 | 3/1969 | Chavis | 123/102 |
| 3,529,211 | 9/1970 | Brayley | 317/31 |
| 3,539,865 | 11/1970 | Billings | 317/31 |
| 3,541,392 | 11/1970 | Vargo et al. | 317/31 |
| 3,630,177 | 12/1971 | Engel | 123/32 EA |
| 3,691,427 | 9/1972 | Honda et al. | 317/31 |
| 3,699,935 | 10/1972 | Adler et al. | 123/102 |
| 3,713,427 | 1/1973 | Adler | 123/32 EA |
| 3,739,757 | 6/1973 | Ohtani et al. | 123/102 |
| 3,867,918 | 2/1975 | Williams et al. | 123/139 E |

*Primary Examiner*—C. J. Husar
*Assistant Examiner*—Paul Devinsky

[57] ABSTRACT

A Fuel System for an engine includes an actuator for controlling the output of a pump and a pair of d.c. supply lines the voltage across which is determined by a voltage regulator. A series circuit including a resistor, a relay coil and a transistor is connected across the supply lines and first means is provided for turning transistor off if the current flow through the actuator exceeds a predetermined value. Second means including a resistor is provided to maintain transistor de-energised when it has been turned off to prevent further operation of the actuator. In addition switch means is provided to short circuit the resistor if the potential between the supply lines falls below a second predetermined value.

5 Claims, 2 Drawing Figures

FUEL SUPPLY SYSTEMS FOR DIESEL ENGINES

This invention relates to fuel supply systems for diesel engines.

A system according to the invention comprises in combination a pump for supplying fuel to the engine, an electrically operated actuator for controlling the output of the pump, a pair of d.c. supply lines, a voltage regulator for restricting the potential across said supply lines to a first predetermined value, a series circuit connected across said supply lines and including a resistor, a relay winding and a transistor, first means for turning said transistor off when the current flowing in the actuator exceeds a predetermined value, second means operable upon de-energisation of the relay winding when the transistor is turned off for preventing operation of the actuator, and switch means for short-circuiting said resistor if the potential between the supply lines falls below a second predetermined value.

In the accompanying drawings.

Figure 1:
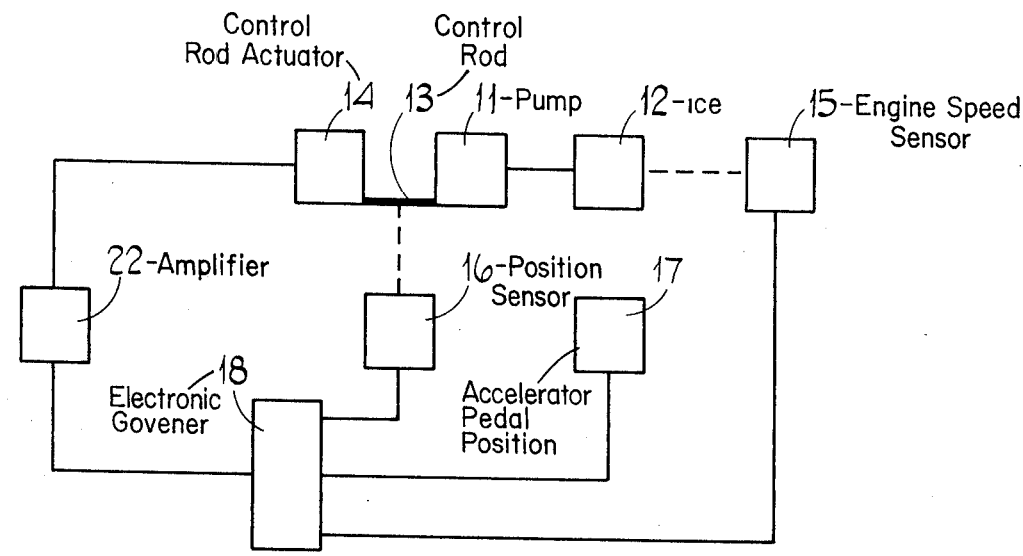
FIG. 1 is a block diagram of a fuel supply system.

Referring first to FIG. 1, a pump 11 supplies fuel to a diesel engine 12 on a road vehicle, the quantity of fuel injected being determined by a control rod 13 the position of which is controlled by an electrically operated actuator 14. A transducer 15 measures the rotational speed of the engine 12, a further transducer 16 measures the position of the control rod 13, and a third transducer 17 produces an output representing demand, which is usually set by the accelerator pedal of the vehicle. The outputs from the transducers are fed to an electronic governor 18, of the type disclosed in U.S. Pat. No. 3,867,918 to Williams et al., incorporated herein by reference, which produces an output which is fed by way of a power amplifier 22 to the actuator 14. The arrangement is such that the quantity of fuel injected is controlled in accordance with the values of the three measured parameters. A practical arrangement will of course be considerably more complex than indicated, but the basic essentials of the system are indicated in FIG. 1.

Figure 2:
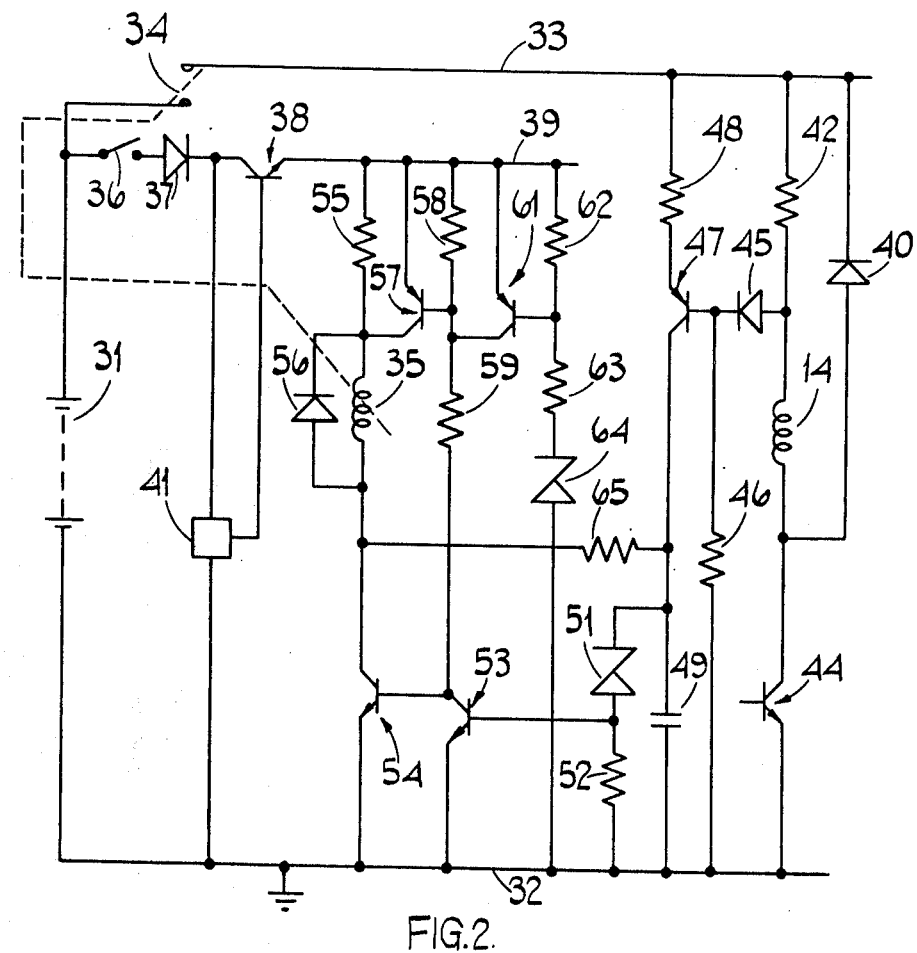
FIG. 2 is a circuit diagram illustrating one example of the invention.

Referring now to FIG. 2, the road vehicle driven by the engine 12 incorporates a battery 31 the negative terminal of which is connected to a supply line 32 which is earthed. The positive terminal of the battery 31 is connected to a supply line 33 through the normally open contact 34 of a relay having a winding 35. The positive terminal of the battery 31 is further connected through a switch 36 corresponding to the ignition switch in a petrol-engined vehicle to the anode of a diode 37 the cathode of which is connected to the collector of an n-p-n transistor 38 having its emitter connected to a supply line 39. The cathode of the diode is connected to the line 32 through a voltage-sensitive circuit 41 which is connected to the base of the transistor 38, and the diode 37, transistor 38 and circuit 41 together constitute a voltage regulator which maintains a relatively low-voltage supply between the lines 39, 32, and disconnects the line 39, from the battery 31 if the voltage at the collector of the transistor 38 rises above a predetermined value.

Connected between the lines 33, 32 is a series circuit including a resistor 42, the actuator 14 and the collector-emitter of a transistor 44, the base of which is connected to the output terminal of the governor 18 through a coupling circuit known in the art, for example applicants U.S. Pat. No. 3,795,826. Therefore the transistor 44 is turned on and off with a ratio determined by the governor 18, and so sets the mean current flow in the actuator 14. The junction of the resistor 42 and actuator 14 is connected to the line 32 through a diode 45 and a resistor 46 in series, the junction of the diode 45 and resistor 46 being connected to the base of a p-n-p transistor 47, the emitter of which is connected through a resistor 48 to the line 33 and the collector of which is connected to the line 32 through a capacitor 49 which is bridged by a Zener diode 51 and a resistor 52 in series. The junction of the Zener diode 51 and resistor 52 is connected to the base of a p-n-p transistor 53 having its emitter connected to the line 32 and its collector connected to the base of an n-p-n transistor 54 with its emitter connected to the line 32 and its collector connected to the line 39 through the winding 35 and the resistor 55 in series, the winding 35 being bridged by a freewheel diode 56. The resistor 55 is bridged by the collector-emitter path of a p-n-p transistor 57 the base of which is connected through a resistor 58 to the line 39, and through a resistor 59 to the collector of the transistor 53. The junction of the resistors 58 and 59 is connected to the collector of a p-n-p transistor 61, the emitter of which is connected to the line 39 and the base of which is connected to the line 39 through a resistor 62, and to the line 32 through a resistor 63 and a Zener diode 64 in series. Finally, the collector of the transistor 54 is connected through a resistor 65 to the collector of the transistor 47. A freewheel diode 40 is connected between the line 33 and the collector of the transistor 44.

In operation, the transistor 38 and its associated components regulate the potential between the lines 39, 32 as previously explained. When the ignition switch 36 is closed, the transistor 38 turns on and current flows through the resistors 58 and 59 to turn on the transistor 54, so that the relay winding 35 is energised by way of the resistor 55 to close the contact 34 and supply power to the actuator 14, which conducts at the level determined by the transistor 44, which in turn is controlled by the governor 18. If the potential between the lines 39, 32 is at the desired level, the Zener diode 64 will be conducting and so the transistor 61 will be on, and the transistor 57 will be off.

The transistor 47 is normally conducting and its level of conduction depends upon the current flowing in the actuator 14. The current flowing flows by way of resistor 65 and the collector emitter path of transistor 54, the capacitor 49 being charged to voltage depending on the volt drops across the resistor 65 and the transistor 54. This voltage is normally insufficient to cause the Zener diode 51 to conduct so that transistor 53 remains off. If the current flow in the actuator 14 should increase beyond a predetermined value then the voltage across the capacitor will increase to a value sufficient to cause breakdown of the Zener diode, due to the increased flow of current through transistor 47. Transistor 53 is therefore rendered conductive and transistor 54 is turned off the turning off process being rapid due to feed back through resistor 65. With transistor 54 turned off the relay is de-energised so that contact 34 is opened and is opened and the supply of current to the actuator is broken. Moreover, resistor 65 maintains the flow of current in the Zener diode so that transistor 53 remains on. The circuit therefore latches and normal operation of the circuit can only be obtained by opening and reclosing switch 36.

If at any time the potential between the lines 39, 32 falls below a predetermined level, then the Zener diode 64 ceases to conduct, the transistor 61 turns off and the transistor 57 turns on, short-circuiting the resistor 55. The operation remains unaffected, and it will be appreciated that using this arrangement the winding 35 can be rated to operate over a wide range of potentials between the lines 39, 32.

We claim:

1. A fuel supply system for a diesel engine comprising in combination a pump for supplying fuel to the engine, an electrically operated actuator for controlling the output of the pump, a pair of D.C. supply lines, a voltage regulator for restricting the potential across said supply lines to a first predetermined value, a series circuit connected across said supply lines and including a resistor, a relay winding and a first transistor, first means for turning said transistor off when the current flowing in the actuator exceeds a predetermined value, including a Zener diode which is arranged to break down when the current flow through the actuator exceeds said predetermined value, a second transistor which is turned on by the current flow in the Zener diode, said second transistor removing the base drive to said first transistor when rendered conductive, second means operable upon de-energization of the relay winding when the transistor is turned off for preventing operation of the actuator, switch means for short-circuiting said resistor if the potential between the supply lines falls below a second predetermined value and third means for maintaining the current flow in said Zener diode when the actuator is turned off.

2. A system as claimed in claim 1, in which said third means comprises a further resistor.

3. A system as claimed in claim 2 in which said first means includes a second transistor responsive to the voltage developed across an impedance in the actuator circuit, the conduction of the second transistor increasing as the current flow in the actuator increases, said second transistor having said Zener diode and said further resistor included in its emitter collector circuit, said further resistor being connected so as to pass the emitter collector current of the second transistor until breakdown of said Zener diode takes place.

4. A system as claimed in claim 3 in which said second means comprises a contact of the relay, said contact when opened as a result of de-energisation of the relay winding, acting to prevent flow of current in the actuator and in said second transistor.

5. A system as claimed in claim 4 including a capacitor connected in parallel with a circuit including said Zener diode.

* * * * *